(12) United States Patent
Seo et al.

(10) Patent No.: US 7,521,150 B2
(45) Date of Patent: Apr. 21, 2009

(54) SECONDARY BATTERY INCLUDING RESIN CAVITY SIDE COVERING

(75) Inventors: Kyungwon Seo, Yongin-si (KR); Yonggeol Kwon, Yongin-si (KR); Sangjoo Lee, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 11/848,180

(22) Filed: Aug. 30, 2007

(65) Prior Publication Data

US 2008/0057383 A1 Mar. 6, 2008

(30) Foreign Application Priority Data

Aug. 31, 2006 (KR) ........................ 10-2006-0083703

(51) Int. Cl.
H01M 2/26 (2006.01)
H01M 2/00 (2006.01)
H01M 2/02 (2006.01)

(52) U.S. Cl. ........................ 429/177; 429/163; 429/179; 429/121; 429/178

(58) Field of Classification Search ................ 429/121, 429/178, 176, 122, 177, 179
See application file for complete search history.

(56) References Cited

U.S. PATENT DOCUMENTS

2004/0137314 A1* 7/2004 Fukui ........................ 429/62

2004/0191616 A1* 9/2004 Hirota ........................ 429/121
2005/0064286 A1* 3/2005 Kozu et al. .................. 429/180

FOREIGN PATENT DOCUMENTS

| JP | 2003-223872 | 8/2003 |
| JP | 2003-234096 | 8/2003 |
| JP | 2004-362874 | 12/2004 |

OTHER PUBLICATIONS

Patent Abstracts of Japan, Publication No. 2003-223872, dated Aug. 8, 2003, in the name of Masanori Narutomi.
Patent Abstracts of Japan, Publication No. 2003-234096, dated Aug. 22, 2003, in the name of Katsumi Takatsu et al.
Patent Abstracts of Japan, Publication No. 2004-362874, dated Dec. 24, 2004, in the name of Takashi Sumida.

* cited by examiner

*Primary Examiner*—Dah-Wei D Yuan
*Assistant Examiner*—Zachary Best
(74) *Attorney, Agent, or Firm*—Christie, Parker & Hale, LLP

(57) ABSTRACT

A secondary battery includes a bare cell having a terminal side from which an electrode terminal protrudes, an opposing side opposite the terminal side, and a longitudinal side. A circuit module is on the longitudinal side and a resin molding covers the circuit module. A lead electrode electrically connects the electrode terminal and the circuit module. A side covering is attached to at least one of the terminal side and the opposing side, the side covering including a base and a skirt defining a resin cavity adapted to receive hot melt resin.

13 Claims, 10 Drawing Sheets

SECONDARY BATTERY INCLUDING RESIN CAVITY SIDE COVERING

CROSS-REFERENCE TO RELATED APPLICATION

This application claims priority to and the benefit of Korean Application No. 2006-0083703, filed on Aug. 31, 2006, in the Korean Intellectual Property Office, the entire disclosure of which is incorporated herein by reference.

BACKGROUND OF THE INVENTION

1. Field of the Invention

The present invention relates to a secondary battery, and more particularly to a secondary battery having a resin cavity side covering.

2. Description of Related Art

Secondary batteries are rechargeable batteries and are often used as a power source for various portable electronic devices, for example, cellular phones, laptop computers, camcorders, and hybrid motor vehicles.

In particular, a lithium secondary battery has an operating voltage of 3.6 volts, which is about 3 times greater than nickel-cadmium (Ni—Cd) batteries, or nickel-hydrogen (Ni-MH) batteries commonly used to power electronic equipment. In addition, since energy density per unit weight of lithium secondary batteries is high, secondary batteries can be compact. Accordingly, lithium secondary batteries are often now used instead of Ni—Cd or Ni-MH batteries.

Conventional lithium secondary batteries have a prismatic exterior made from a thin sheet of metal. Prismatic secondary batteries typically include a cover and an outer case attached to a bare cell having an electrode assembly housed in a can. The cover is often made from a resin molded cover and an injection molded hard cover. When a circuit module, such as a protective circuit, is attached to the bare cell to form a core pack, the resin molding cover at least partially covers the circuit module. When the hard cover is attached to the resin molding cover, part of the hard cover is overlapped by the resin cover. Usually, such a configuration is used on secondary batteries, such as prismatic secondary batteries, which do not have an external electrode terminal. In such a configuration, the side cover is relatively weakly attached to the can, causing frequent separation between the side cover and the can.

To reinforce the weak adhesion, a label may be used to cover the side cover. However, if the label is damaged, the attachment between the side cover and the can may deteriorate or fail. Moreover, since insulation and mechanical protection of the secondary battery is dependent on the side cover, if the boundary between the side cover and the rest of the secondary battery degrades, a gap is created between the side cover and the can, allowing debris such as dust or humidity to infiltrate the gap, thereby degrading the quality of the secondary battery.

SUMMARY OF THE INVENTION

A secondary battery includes a bare cell having a terminal side from which an electrode terminal protrudes, an opposing side opposite the terminal side, and a longitudinal side. A circuit module is on the longitudinal side and a resin molding covers the circuit module. A lead electrode electrically connects the electrode terminal and the circuit module. A side covering is attached to at least one of the terminal side and the opposing side, the side covering including a base and a skirt defining a resin cavity adapted to receive hot melt resin.

The side covering may include a terminal side covering attached to the terminal side and an opposing side covering attached to the opposing side. The side covering may have a polygon or a semicircle lateral cross section and may contact or be spaced from the lead electrode.

The side covering may also include a stopper extending from the skirt along the base, wherein the stopper contacts the lead electrode and seals hot melt resin within the side covering. Additionally, the side covering may have a bonding groove extending from the base into the resin cavity.

DETAILED DESCRIPTION

Figure 1:
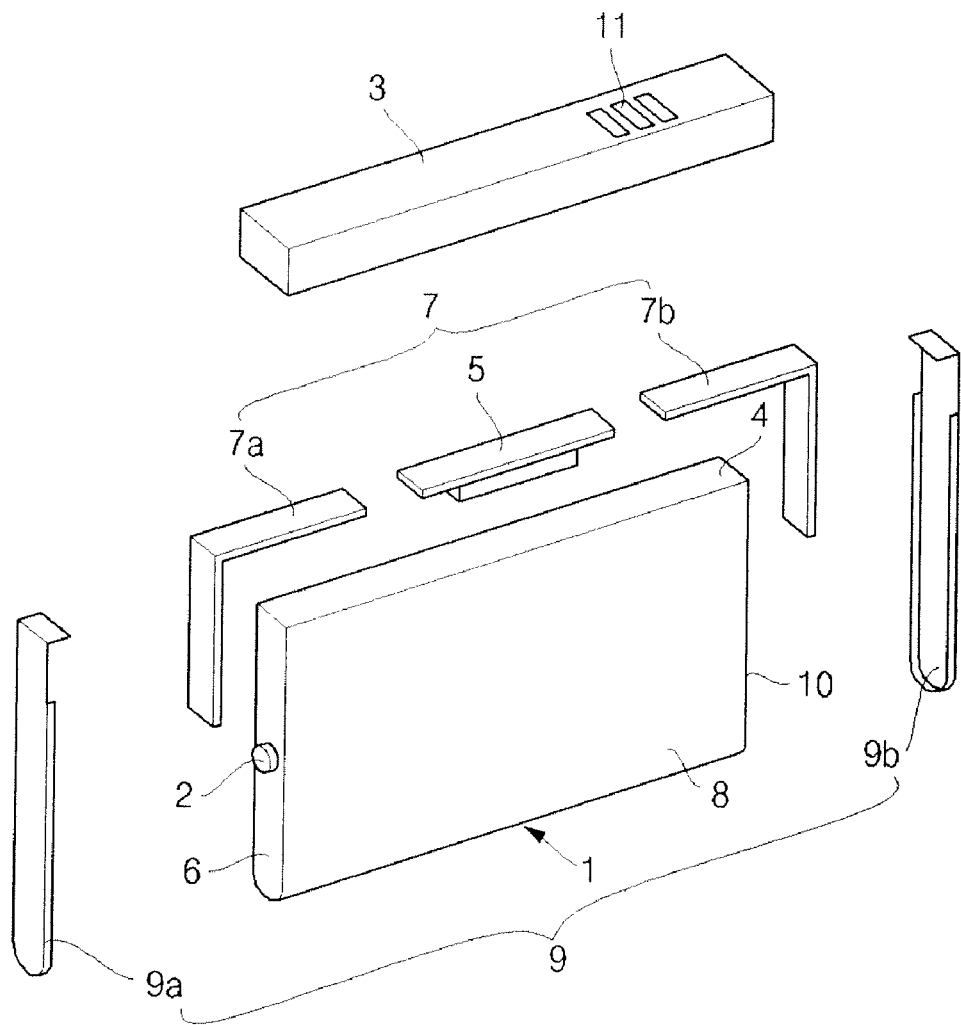
FIG. 1 is a partially exploded perspective view of a secondary battery including a resin cavity side covering according to an exemplary embodiment of the present invention.

Referring FIG. 1, a secondary battery includes a bare cell 1 and a resin molding 3; a circuit module 5; a lead electrode 7 having a first lead electrode 7a and a second lead electrode 7b; and side covering 9 having a terminal side covering (or first side covering) 9a and an opposing side covering (or second side covering) 9b attached to the bare cell, as described in more detail below.

The bare cell 1 stores and supplies electricity, and includes a terminal side (or second surface) 6 from which the electrode terminal protrudes and an opposing side (or third surface) 10 opposite the terminal side. The bare cell 1 further includes longitudinal side (or first surfaces) 4 connected to the terminal side 6 and opposing side 10, and planar surfaces (or four surfaces) 8. In one exemplary embodiment, the bare cell 1 includes an electrode assembly (FIG. 9) housed in a substantially rectangular metal can. An electrode terminal 2 electrically connected to the electrode assembly may protrude from one end of the can. The electrode terminal 2 is electrically connected to the circuit module 5 via the second lead electrode 7a, and covered by the terminal side covering 9a. In one exemplary embodiment, the can has a polarity different from the electrode terminal 2. For example, if the electrode terminal 2 is a negative electrode terminal, the can may be a positive electrode terminal.

The resin molding 3 protects the lead electrode 7 and the circuit module 5 from debris, and is formed by attaching hot melt resin to the bare cell 1. The resin molding 3 also overlaps a portion of the side covering 9 to more securely attach the side covering 9 to the bare cell 1. The resin molding 3 may be located on a longitudinal side surface 4 of the bare cell 1 or on a terminal side 6 from which the electrode terminal 2 protrudes. Electrodes 11 may be exposed through the resin molding 3 to connect the circuit module 5 to external devices.

The circuit module 5 controls discharging and recharging of the bare cell 1. As such, the bare cell 1 is electrically connected to the electrode terminal 2 and the can via the lead electrode 7. Additionally, the bare cell 1 is connected to the exposed electrode 11 to provide electricity. The circuit module 5 is covered by the resin molding 3, and thus protected by the resin molding 3. The circuit module 5 may contain a protection circuit, such as a thermal reactive element, to protect the secondary battery from defects such as overheating, short circuits, or leakage that may occur during discharging and recharging of the secondary battery.

The lead electrode 7 electrically connects the circuit module 5 and the bare cell 1. Specifically, the lead electrode 7 connects the electrode terminal 2 to the circuit module 5 and connects the can to the circuit module 5. In one exemplary embodiment, the lead electrode 7 is narrower than the side covering 9 which covers the lead electrode to form the resin cavity. The lead electrode 7 may be fixed to the bare cell 1 by the hot melt supplied through the resin cavity, thereby protecting the lead electrode from, for example, humidity, dust and other debris. The first and second lead electrodes 7a, 7b may extend along the longitudinal side 4 of the bare cell 1 to the terminal side 6 and the opposing side 10 of the bare cell 1.

The side covering (also referred to as a resin cavity side covering) 9 is attached to the sides 6, 10 of the bare cell 1 to protect the lead electrode 7 from debris and humidity. The side covering 9 is adapted to define a resin cavity, and allows hot melt resin to be supplied into the resin cavity. Exemplary side coverings will be described in more detail with reference to FIGS. 2 and 3a-3d.

Figure 2:
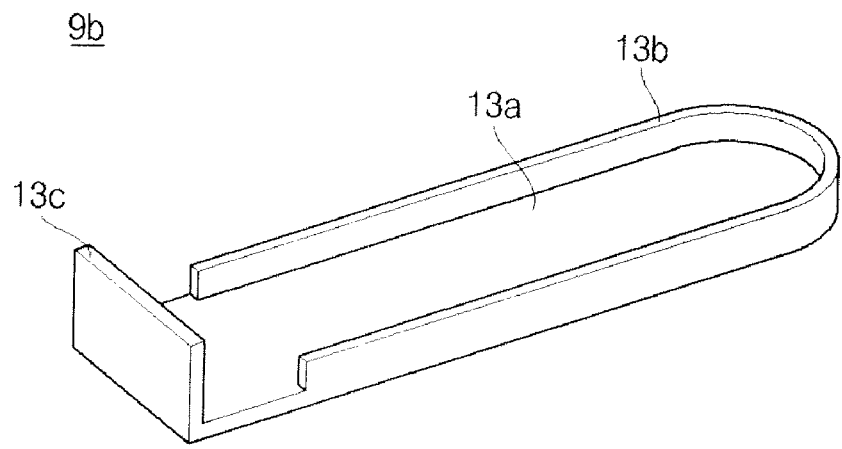
FIG. 2 is a perspective view of a resin cavity side covering according to an exemplary embodiment of the present invention.

FIG. 2 is a perspective view of the terminal side covering according to an exemplary embodiment of the present invention. Since the terminal and opposing side coverings 9a, 9b are substantially similar, only the opposing side covering 9b will be described. Referring FIG. 2, the opposing side covering 9b includes a base 13a, a skirt 13b, and a side wall 13c.

The skirt 13b and the side wall 13c extend from the base 13a. In one exemplary embodiment, the base 13a is longer than the opposing side 10 of the bare cell 1 to allow the side wall 13c to be inserted into the resin molding 3. The width of the base 13a may be substantially the same as the opposing side 10, or may be wider than the opposing side 10. In particular, the resin cavity is formed by the skirt 13b and the base 13a. As a result, the resin molding is fixed to a portion of the skirt 13b and the base 13a to more securely fix the opposing side covering 9b and simultaneously protect the lead electrode 7b.

The skirt 13b may be adapted to contact the opposing side 10 or the planar surfaces 8 of the bare cell 1 to form the resin cavity. Additionally, the skirt 13b may include slits (not shown) to form skirt sections rather than a continuous surface.

The side wall 13c is adapted to be inserted into the resin molding 3 to more securely attach the opposing side covering 9b. The side wall 13c may have various shapes and lengths, or may be omitted entirely.

Figure 3A:
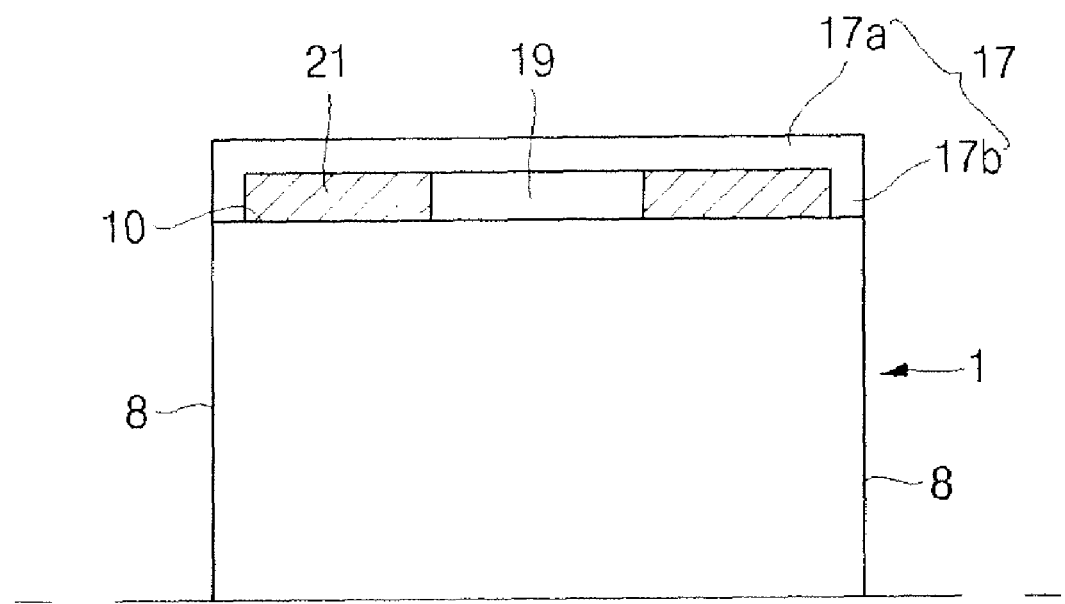
FIGS. 3a, 3b, 3c and FIG. 3d are cross sectional views of exemplary resin cavity side coverings of the present invention.

Referring now to FIG. 3a, the side covering 17 is shown attached to a opposing side 10 of the bare cell 1. Specifically, the skirt 17b is attached to the opposing side 10 of the bare cell 1 while the base 17a contacts the lead electrode 19. As such, hot melt resin 21 may be filled into the resin cavity created between the lead electrode 19 and the side covering 17. Although the base 17a is shown in contact with the lead electrode in FIG. 3a, a small gap may be also left between the base 17a and the lead electrode 19.

Figure 3B:
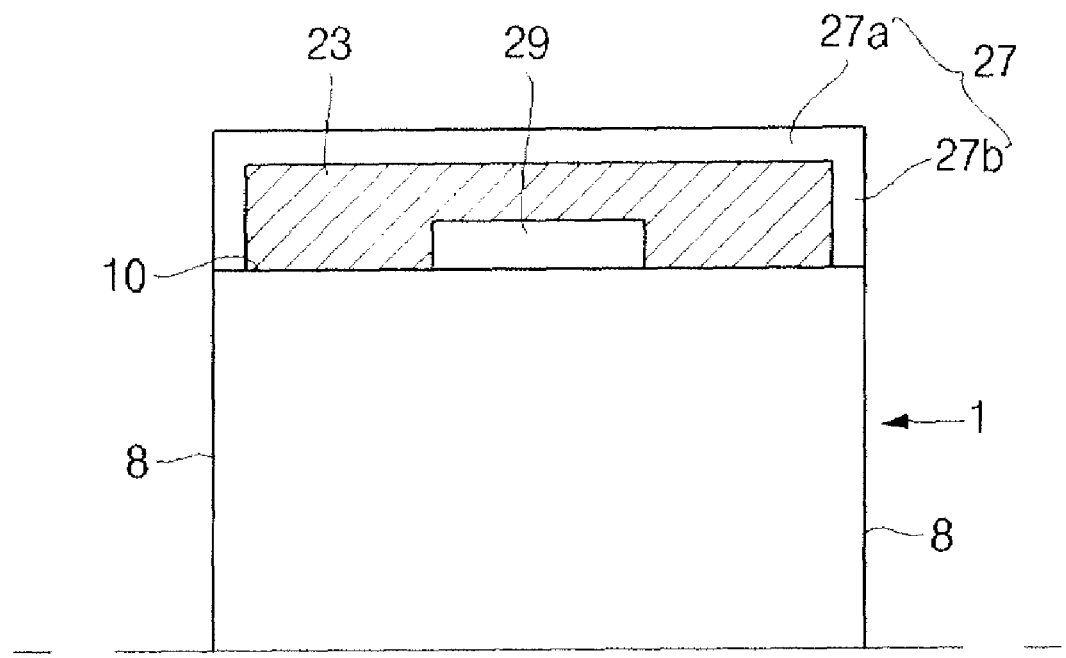

In FIG. 3b, the skirt 27b is adapted to permit resin to be inserted over a lead electrode 29 as well as on either side of it. As such, the side covering 27 may be more securely attached to the bare cell 1 and the lead electrode 29 can be protected from external impact.

Figure 3C:
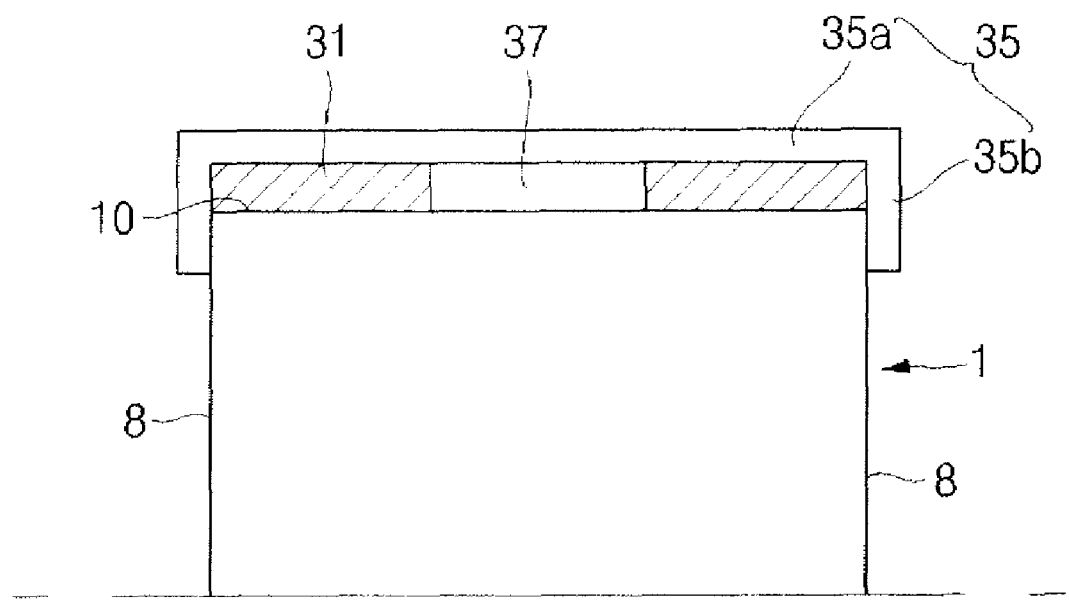
Figure 3D:
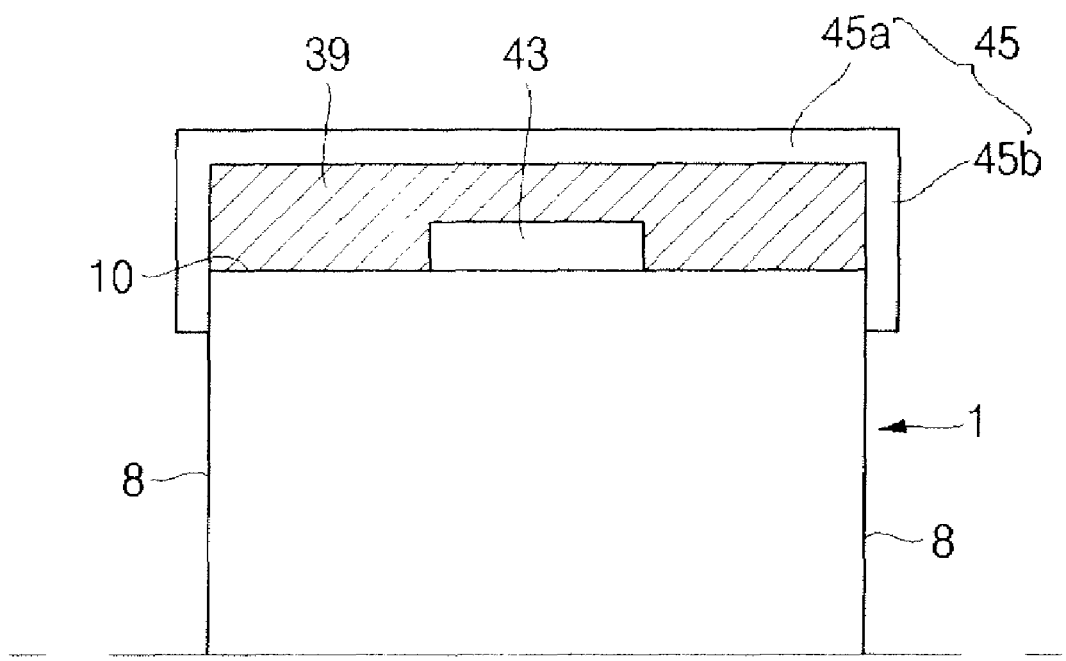

FIGS. 3c and 3d illustrate configurations similar to FIGS. 3a and 3b except that skirts 35b, 45b of respective side coverings 35, 45 are attached to opposite planar surfaces 8 of the bare cell 1. As such, the side coverings 35, 45 may be securely attached to the bare cell 1 while preventing air and/or other debris from penetrating the side coverings 35, 45.

In one exemplary embodiment, the width of lead electrode 19 is between about 20% and about 60% of the width of the opposing side 10 of the bare cell 1 to permit a resin cavity capable of housing a sufficient amount of resin while allowing for a lead electrode 19 to maintain a sufficient electrical connection. If the width of the lead electrode 19 is greater than about 60% of the width of the opposing side 10, the side covering 17 may not be able to be securely fixed to the bare cell 1. On the other hand, if the width of the lead electrode 19 is less than 20% of the width of the opposing side 10, the lead electrode 19 may not provide a sufficient electrical connection.

Figure 4A:
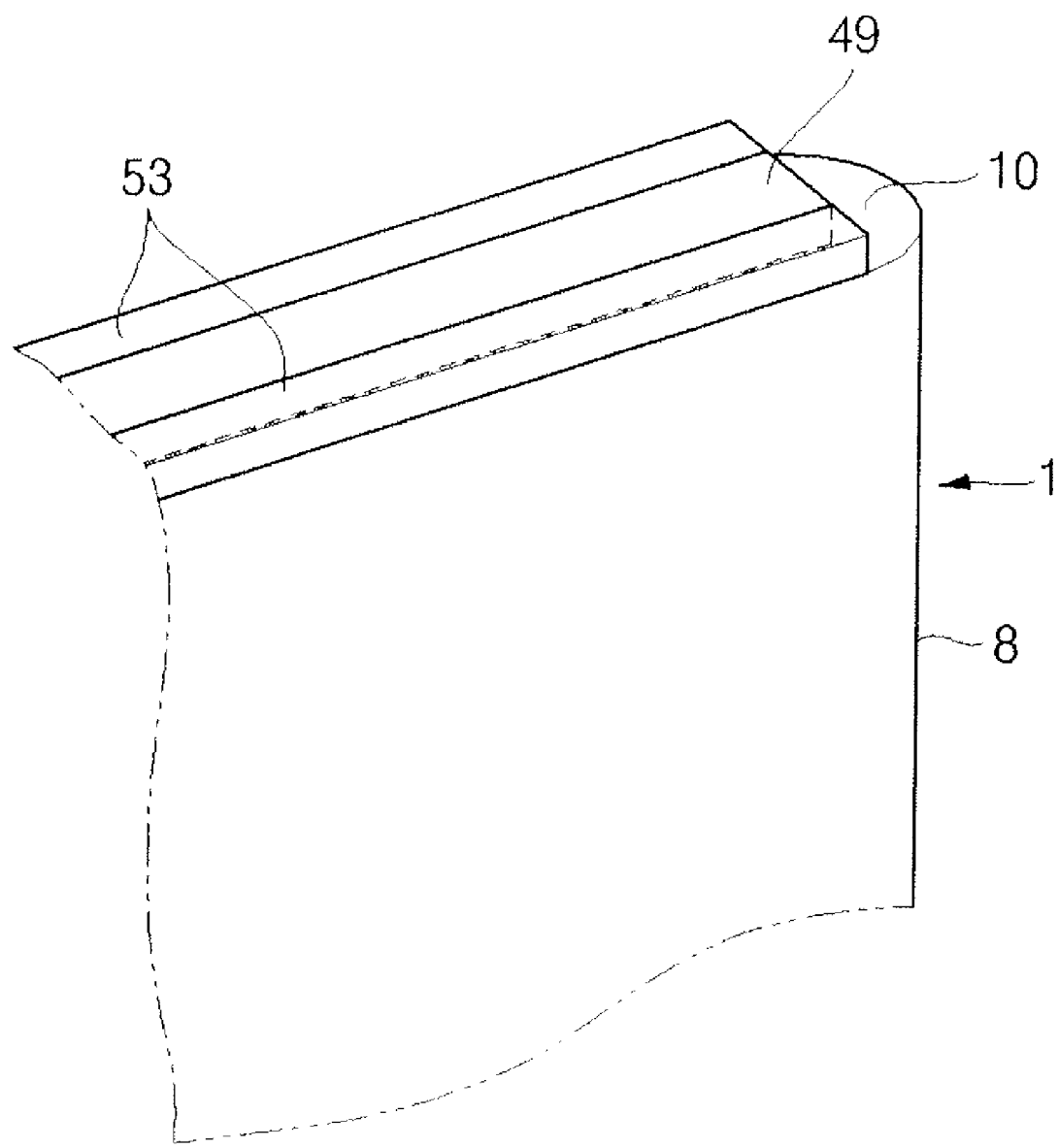
FIGS. 4a and 4b, are perspective views of hot melt resin inserted around a lead electrode according to exemplary embodiments of the present invention.

FIG. 4a illustrates the opposing side 10 of the bare cell 1, wherein the resin cavity 53 is divided by the lead electrode 49, as described above with respect to FIGS. 3a and 3c. Although, as shown in FIG. 4a, the resin cavity 53 and the lead electrode 49 are substantially the same length, the resin cavity 53 and the lead electrode 49 may also be different lengths.

Figure 4B:
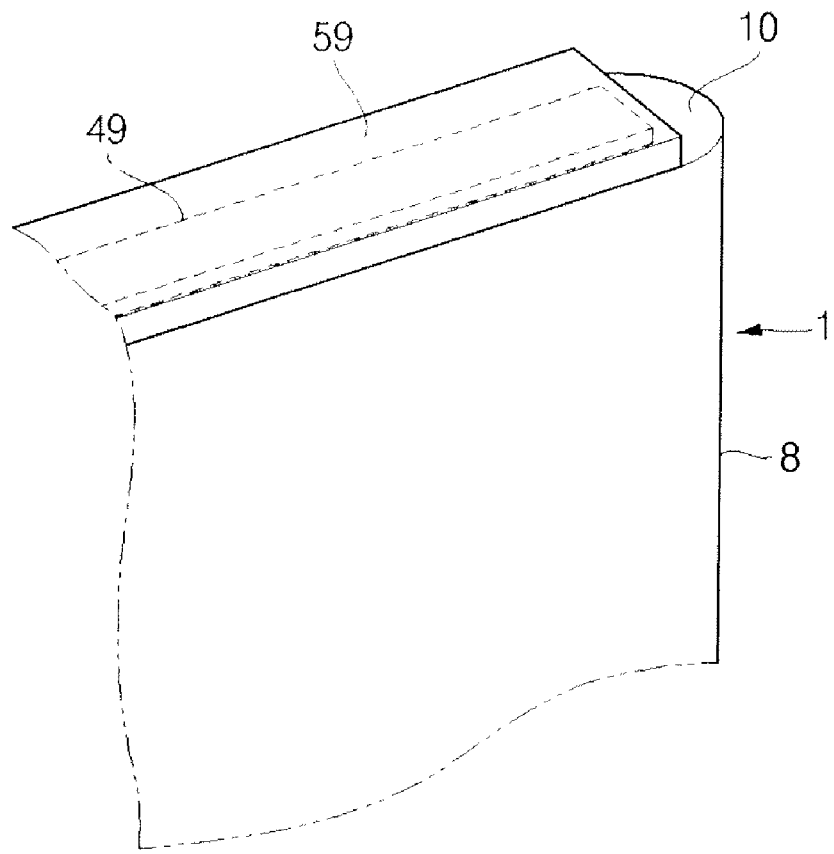

FIG. 4b illustrates the opposing side 10 and the resin cavity 59 covering the top and sides of the lead electrode 49, as described above with respect to FIGS. 3b and 3d.

Although with respect to FIGS. 4a and 4b, the lead electrode 49 and the resin cavities 53, 59 cover a significant length of the opposing side 10, the lead electrode 49 and resin cavities 53, 59 may be configured to extend only a portion of the length of the opposing side 10. Additionally, the lead electrode 49 may cover only a portion of the length of the opposing side 10, while the resin cavities 53, 59 may cover substantially the entire length of the opposing side 10.

Figure 5A:
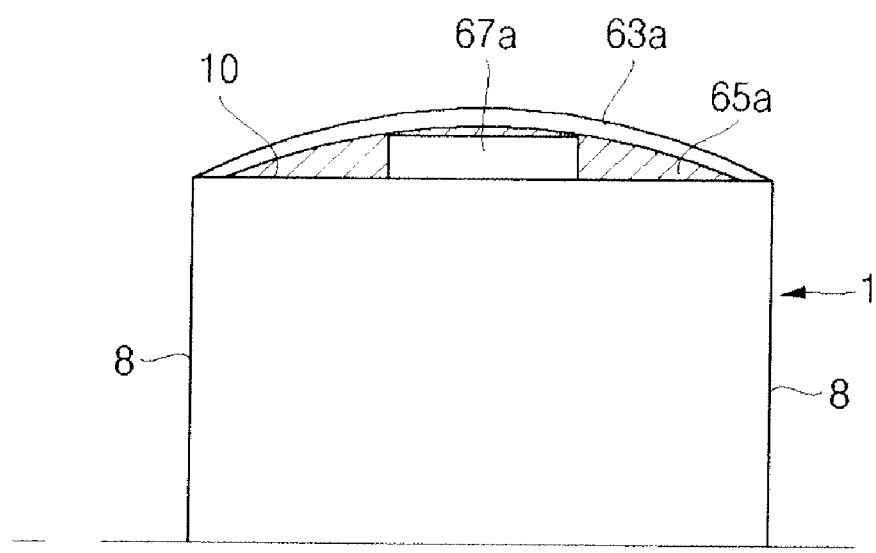
FIGS. 5a, 5b, 5c, 5d, 5e, and 5f are cross sectional views of exemplary resin cavity side coverings of the present invention.
Figure 5B:
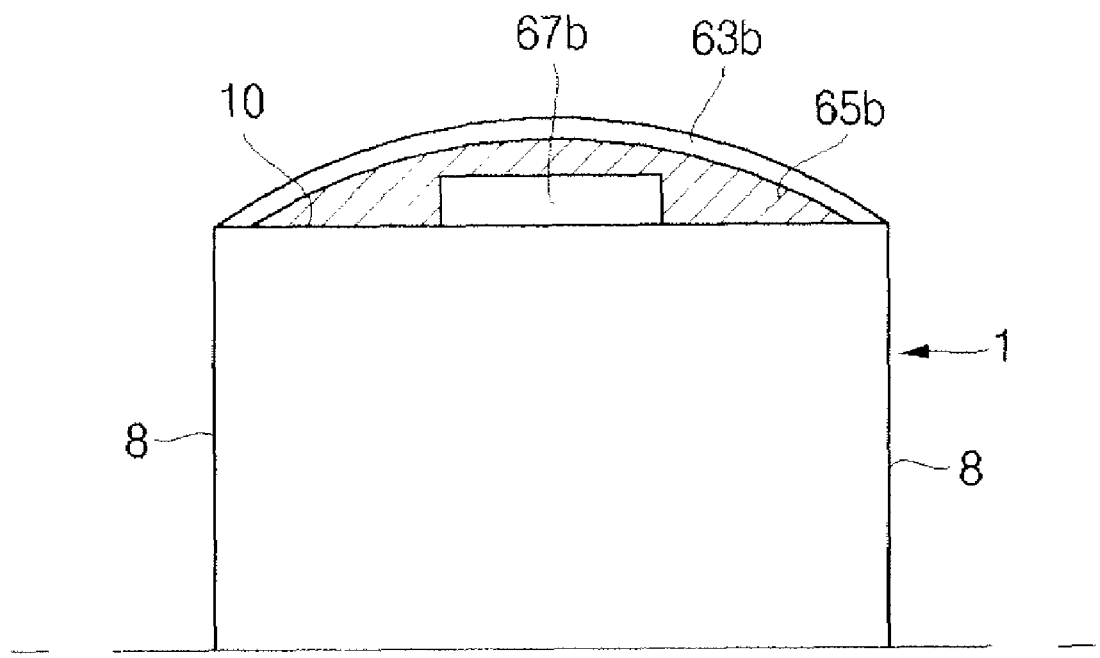

FIGS. 5a-5f illustrate various alternate configurations of side coverings for the bare cell 1. As shown in FIG. 5a, the side covering 63a is a semicircle in contact with the lead electrode 67a and forming the resin cavity 65a. Similarly, FIG. 5b illustrates a semicircle side covering 63b spaced from the lead electrode 67b by the resin cavity 65b.

Figure 5C:
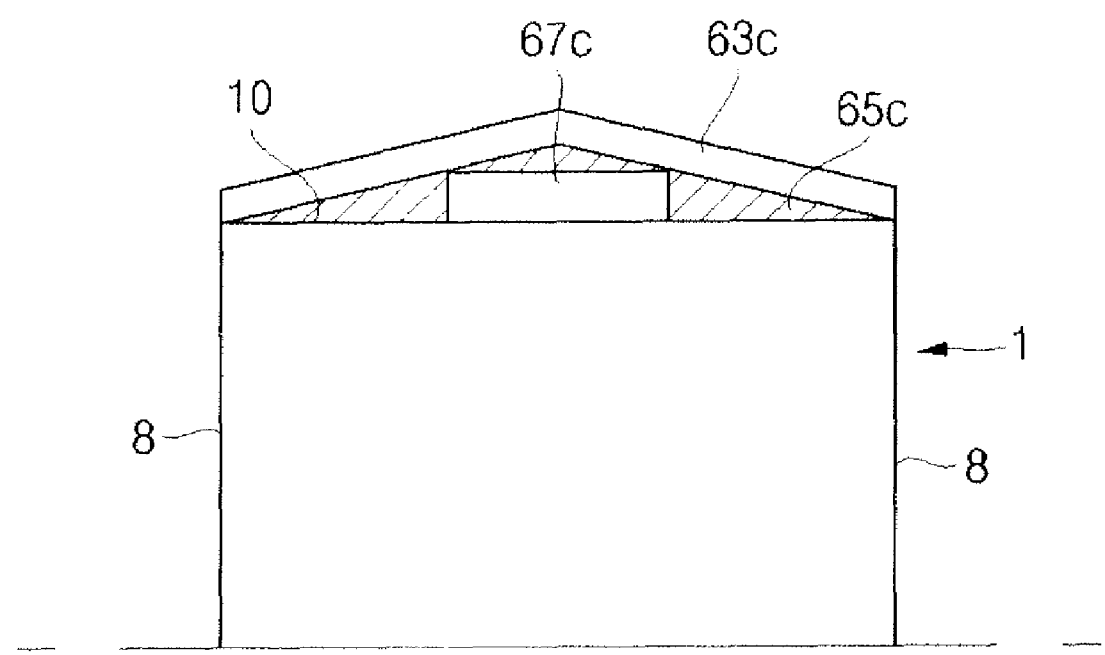
Figure 5D:
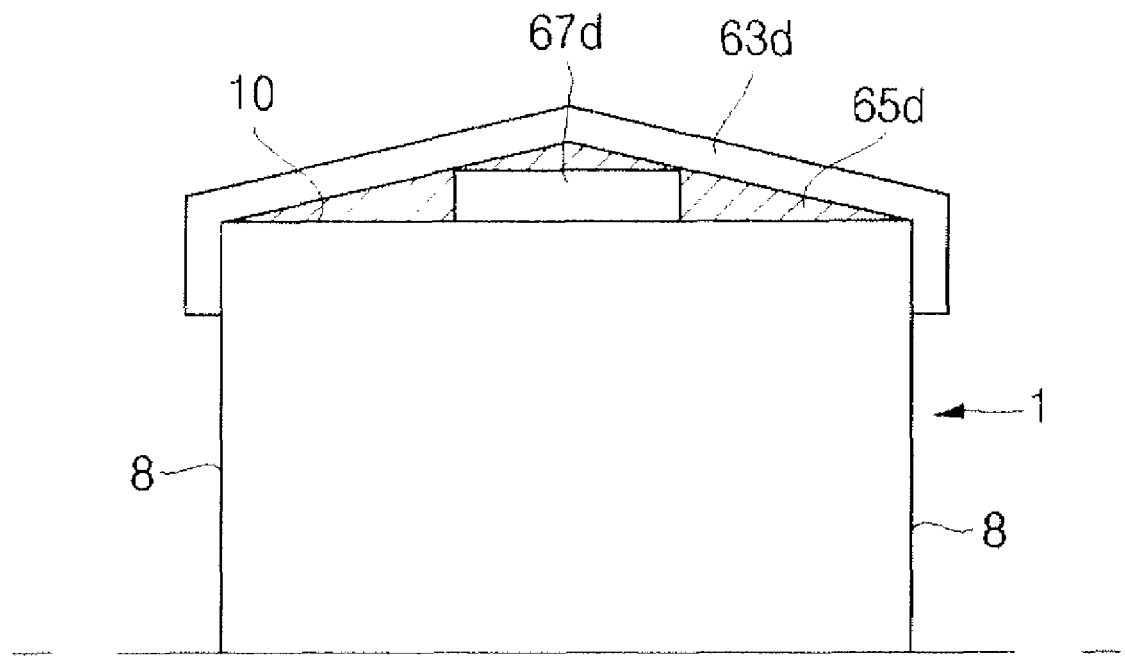

FIGS. 5c and 5d illustrate side coverings 63c, 63d having generally triangular shapes and attached to the opposing side 10 (FIG. 5c) and the planar surfaces 8 (FIG. 5d) of the bare cell 1. As shown in these figures, the resin cavities 65c and 65d may be divided into three parts around the lead electrodes 67c, 67d by the side covering 63c, 63d.

Figure 5E:
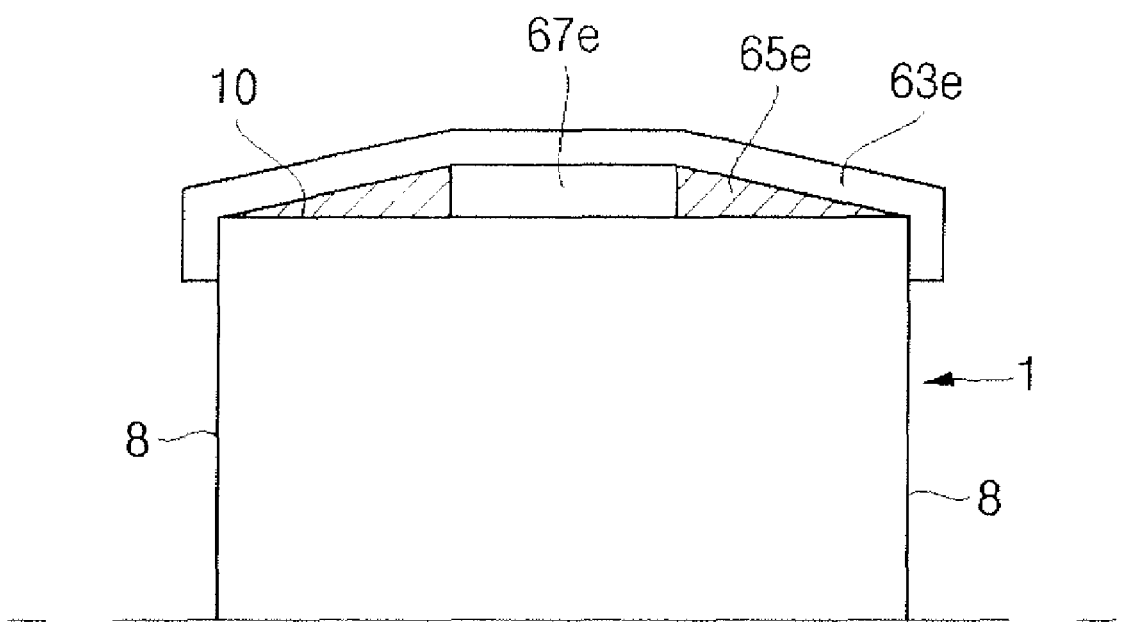
Figure 5F:
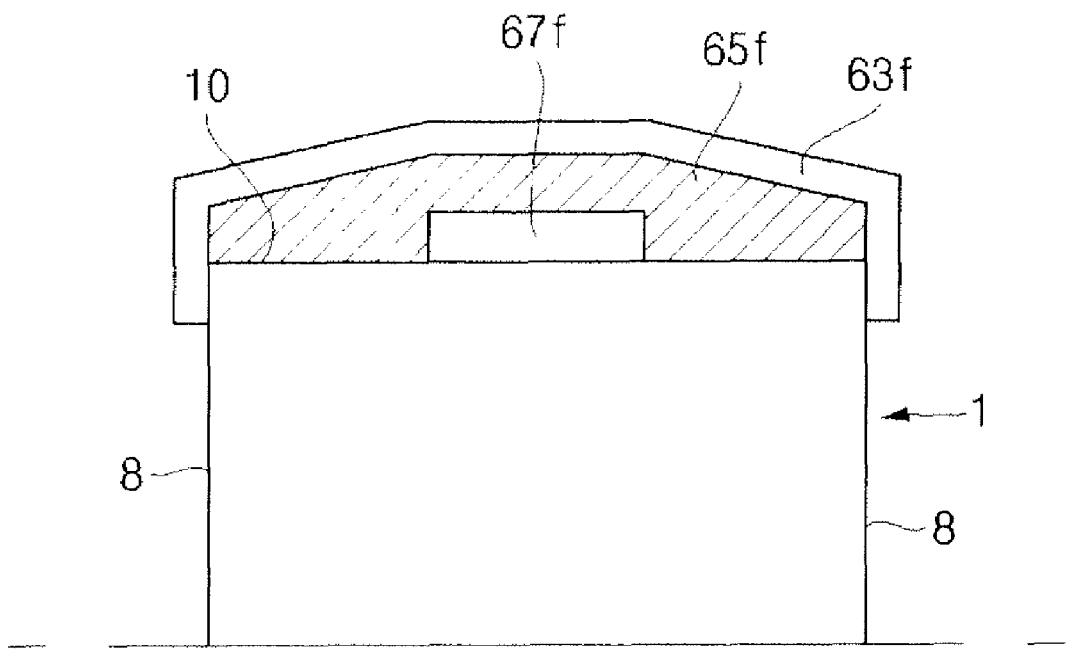

As shown in FIGS. 5e and 5f, the side covers 63e, 63f have a polygonal shape and are attached to the planar surfaces 8 of the bare cell 1. As shown, the side covering 63e may contact the lead electrode 67e or the side covering 63f may be spaced from the lead electrode 67f. One of ordinary skill in the art will appreciate that the side covering may have many geometries in addition to the exemplary geometries described with respect to FIGS. 5a-5f. Additionally, one of skill in the art will appreciate that the side coverings 63a, 63b, 63c, 63d, 63e, 63f may be attached to either the planar surfaces 8 or to the opposing side 10 of the bare cell 1.

Figure 6:
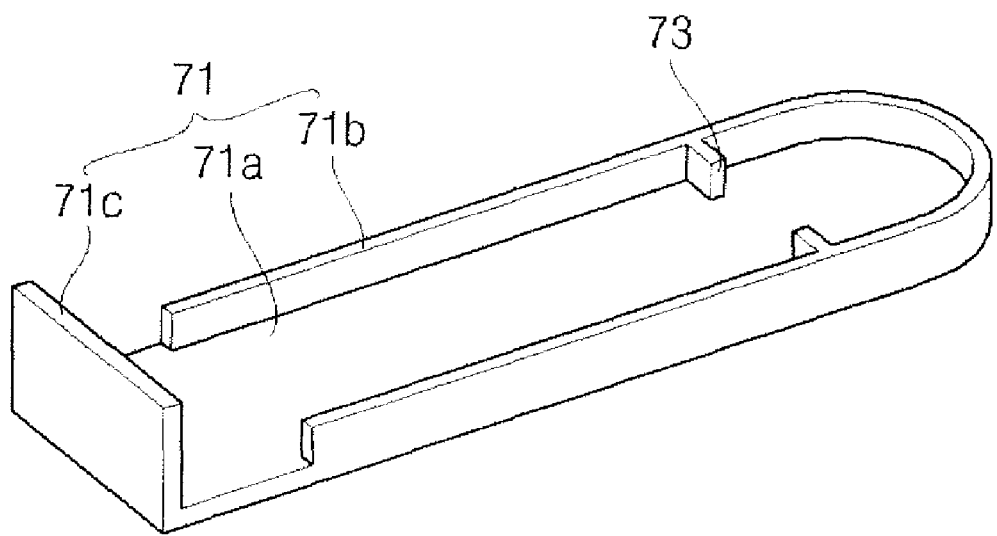
FIG. 6 is a perspective view of a resin cavity side covering having a stopper according to another exemplary embodiment of the present invention.

Referring now to FIG. 6, a side covering 71 according to another embodiment of the present invention includes a base 71a, a skirt 71b, and a side wall 71c. Further, the side covering 71 includes stoppers 73 to define a resin molding area. The stoppers 73 may extend along a base 71a from opposite sides of a skirt 71b, and may be configured to permit a lead electrode to extend between the stoppers 73. If the lead electrode does next extend to the stoppers 73, a single stopper extending across the width of the side covering may be provided to block the flow of the hot melt resin.

Figure 7:
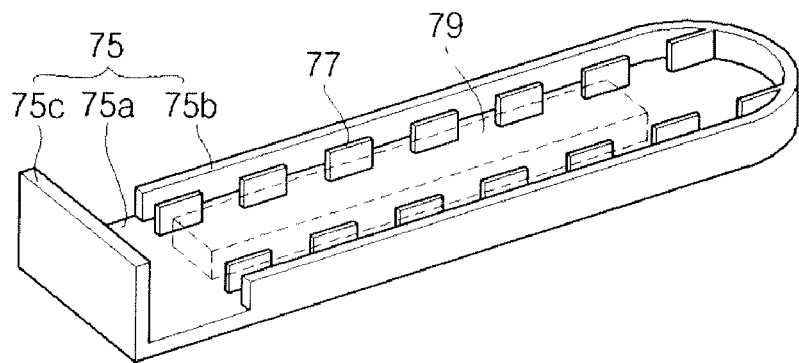
FIG. 7 is a perspective view of a resin cavity side covering with a bonding groove according to still another exemplary embodiment of the present invention.

Referring now to FIG. 7, a side covering 75 according to another embodiment of the present invention includes a base 75a, a skirt 75b, and a side wall 75c. Further, the side covering 75 includes bonding grooves 77 to increase the surface area between the hot melt resin and the side covering, therefore improving adhesion between the components. The lead electrode 79 is shown in phantom for clarity. Although FIG. 7 shows a plurality of bonding grooves 77, the bonding groove may also be a single integrated body and may have a variety of geometries.

Assembly of the bare cell 87 will now be described. Hot melt resin is supplied within the resin cavity and side coverings described above with reference to FIGS. 1-7. Specifically, hot melt resin is poured into resin cavity between the bare cell 87 and the side coverings 82 and allowed to cool. Accordingly, the resin allows the side covering to be attached to the bare cell while providing a sufficient adhesive characteristics.

Figure 8:
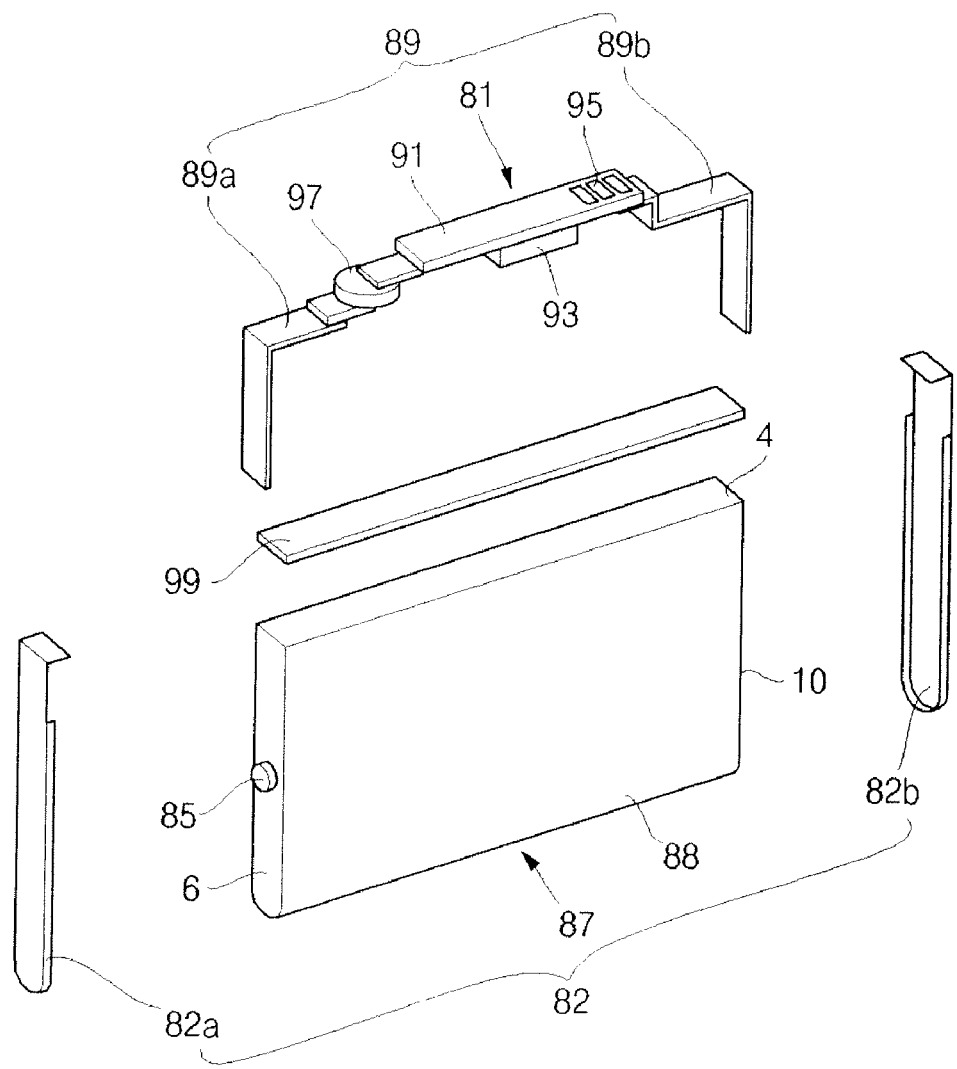
FIG. 8 is a partially exploded perspective view of a secondary battery according to yet another exemplary embodiment of the present invention.

FIG. 8 is a partially exploded perspective view of a secondary battery according to an exemplary embodiment of the present invention, absent the resin molding. Referring to FIG. 8, the secondary battery includes a circuit module 81, lead electrode 89, bare cell 87, and side covering 82.

The bare cell 87 includes an electrode assembly housed in a can 88 and coupled with a cap assembly. The circuit module 81, which controls discharging and recharging of the bare cell 87, is arranged on the longitudinal side 4 of the bare cell 87 and connected to the lead electrode 89. The circuit module 81 includes exposed electrodes 95, to allow electrical connection of external devices to the secondary battery. A circuit element 93 mounted on the printed circuit board 91 and a thermal reactive element 97 located between the protection circuit and the bare cell 87 serves as a protective circuit to protect the bare cell 87 and an externally connected device from, for example, over-discharging, overcharging, a leak and/or a short circuit. The thermal reactive element 97 may be, for example, a thermal fuser or positive temperature coefficient (PTC), which serves to sever electric current when a threshold temperature of the secondary battery is reached. An insulation sheet 99 may also be included for insulation.

The lead electrode 89 includes a first lead electrode 89a connecting the electrode terminal 85 with the printed circuit board 91 and a second lead electrode 89b connecting the can 88 with the circuit module 81. Further, as described above, the lead electrode 89 defines a resin cavity with the side covering 82. The side covering 82 includes a terminal side covering 82a and the opposing side covering 82b attached to a terminal side 6 and an opposite side 10 of the bare cell 87.

The side covering 82 forms a resin cavity to house resin molding when hot melt resin is supplied around the lead electrode 89 as described above. Insulation film or a label may be provided to cover the exterior of the bare cell 87.

Figure 9:
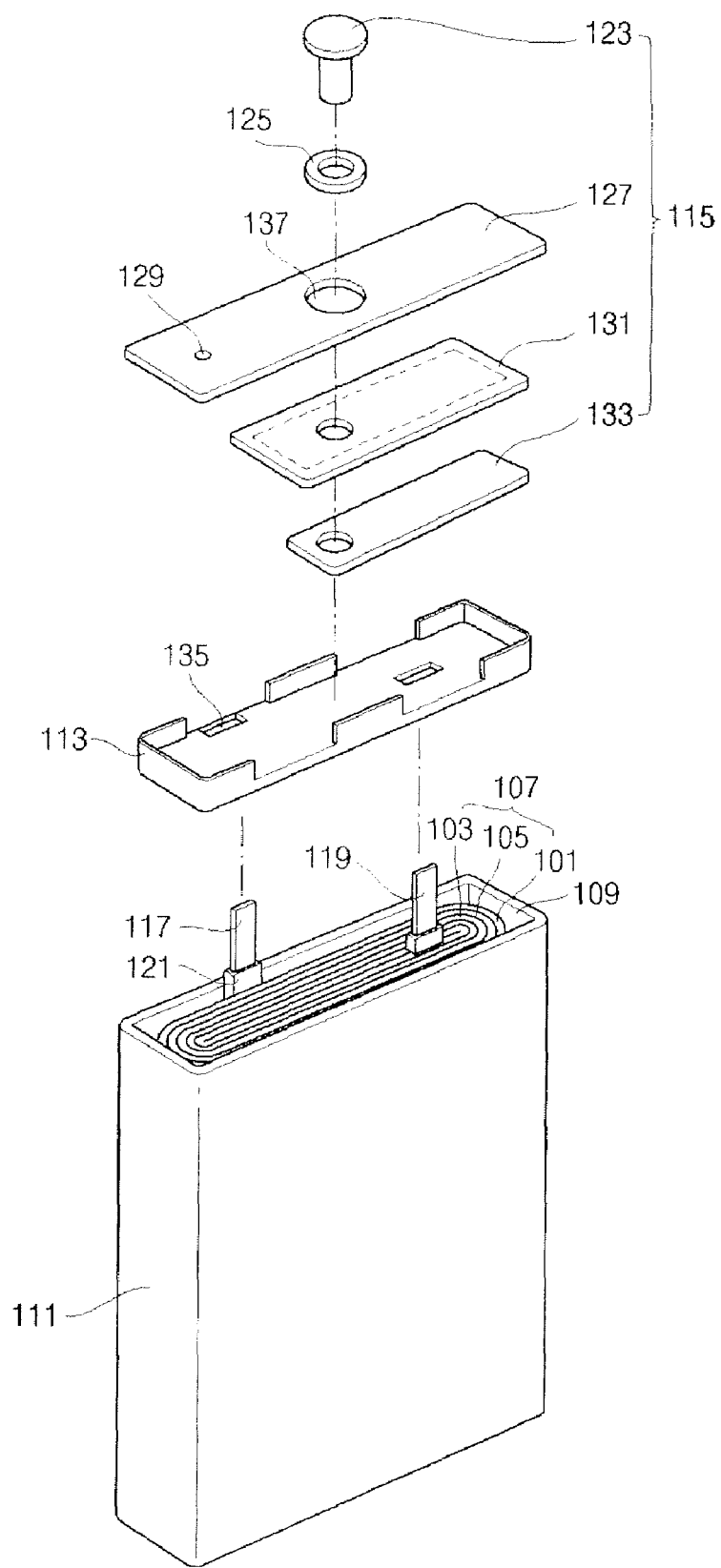
FIG. 9 is a partially exploded perspective view of an exemplary bare cell of the present invention.

With reference now to FIG. 9, the bare cell includes an electrode assembly 107 having a positive electrode 101, negative electrode 103, a positive electrode tab 117 and a negative electrode tab 119. A can 111 having an open end is provided for housing the electrode assembly. A cap assembly 115 and insulation case 113 are provided to seal the open end of the can 111. The can may be made from, for example, aluminum, aluminum alloys or stainless steel which have high heat resistance, wear resistance, and eletroconductivity.

The positive electrode 101 and the negative electrode 103 have a separator 105 between them and may be formed in a jelly roll configuration. The positive electrode 101 and the negative electrode 103 are produced to coat and dry the slurry on the aluminum metal foil and copper metal foil, respectively. The slurry is composed of active materials of both the positive electrode 101 and the negative electrode 103 and adhesives to attach the respective active materials to metal foil. Mainly lithium oxide is used as positive electrode active material, and carbon such as hard carbon, soft carbon, and/or graphite is used as negative electrode active material.

The separator 105 is disposed between the positive electrode 101 and the negative electrode 103 to insulate the positive electrode 101 from the negative electrode 103. Also the separator 105 provides a channel for transportation of ions between the positive electrode 101 and the negative electrode 103. As such, the separator 105 is made of porous polyethylene polypropylene, or polyethylene polypropylene copolymer. In one exemplary embodiment, the separator 105 may be wider than a width of the positive electrode 101 and negative electrode 103 to be protected from a short circuit between the positive electrode 101 and the negative electrode 103.

The positive electrode tab 117 and the negative electrode tab 119, connected respectively to the positive electrode 101 and the negative electrode 103, protrude from the electrode assembly 107. The positive electrode tab 117 and the negative electrode tab 119 are used as a primary route of electric conduction from an external, and insulation tape 121 may be used to insulate electrode plates from a short circuit on the tab 117, 119 of the electrode assembly 107.

The cap assembly 115 includes a cap plate 127, an electrode terminal 123, an insulation plate 131 and a terminal plate 133.

The cap plate 127 contains the terminal hole 137 and electrolyte injection hole 129. Through the terminal hole 137, the electrolyte terminal 123 penetrates the cap plate 127 to be connected with the negative electrode tab 119, being insulated by the gasket 125. The cap plate 127 can be electrically connected with the positive electrode tab 117 projected through the lead hole 135 of the insulation case 113. The electrolyte injection hole 129 is used as a channel to inject electrolyte into the can 111 and is sealed off after electrolyte is injected.

A secondary battery including a resin cavity side covering according to the present invention provides sufficient adhesion of the side covering by hot melt resin supplied and fixed through the resin cavity to stably protect the bare cell.

Further, a secondary battery including a resin cavity side covering according to the present invention prevents the infiltration of the moisture and other debris by a resin molding formed in the resin cavity to improve the quality of rechargeable battery.

Also, a secondary battery including a resin cavity side covering according to the present invention may include various geometries and configurations which can be implemented, therefore reducing manufacturing costs of the secondary battery. The stopper in the resin cavity allows resin molding to be directed to a desired area, ensuring effective performance and inexpensive production of the secondary battery. Additionally, the bonding groove in the resin cavity aids bonding of hot melt resin to the side covering, improving reliability of the side covering.

Although exemplary embodiments of the present invention have been shown and described, it will be appreciated by those skilled in the art that changes may be made in this embodiment without departing from the principles and spirit of the invention, the scope of which is defined in the claims and their equivalents.

What is claimed is:

1. A secondary battery including a resin cavity side covering comprising:
   a bare cell receiving an electrode assembly;
   a resin molding on a first surface of the bare cell;
   a circuit module received in the resin molding;
   a lead electrode electrically connecting the bare cell to the circuit module; and
   a side covering fixedly attached to a side of the bare cell to form a resin cavity in which a resin is filled.

2. The secondary battery as set forth as claim 1, wherein the side covering comprises:
   a first side covering fixedly attached to a second surface of the bare cell, the second surface being a surface neighboring the first surface of the bare cell; and
   a second side covering fixedly attached to a third surface of the bare cell, the third surface. facing the second surface.

3. The secondary battery as claimed in claim 2, wherein the side covering is an open polygon or an open semicircle in which a shape of a cross section perpendicular to the longitudinal direction is bent more than once.

4. The secondary battery as claimed in claim 3, wherein the side covering is fixedly attached to the bare cell so that an inner surface inwardly directed to the cross section of the side covering is attached to the lead electrode.

5. The secondary battery as claimed in claim 3, wherein the side covering is fixedly attached to the bare cell so that an inner surface inwardly directed to the cross section of the side covering is separated from the lead electrode.

6. The secondary battery as claimed in claim 5, wherein an end of the cross section of the side covering contacts a fourth surface of the bare cell, the fourth surface connecting the second surface to the third surface.

7. The secondary battery as claimed in claim 6, wherein the second surface or the third surface is a surface from which an electrode terminal of the bare cell protrudes.

8. The secondary battery as claimed in claim 7, wherein an end of a side of the side covering is in the resin molding and coupled with the resin molding.

9. The secondary battery as claimed in claim 8, wherein the resin filled in the resin cavity is integral with the resin molding.

10. The secondary battery as claimed in claim 9, wherein the inner surface of the side covering has a stopper extending from the inner surface of the side covering,
    wherein the stopper attaches to the lead electrode to seal the resin cavity.

11. The secondary battery as claimed in claim 10, wherein the inner surface of the side covering has a bonding groove in the resin filled in the resin cavity.

12. The secondary battery as claimed in claim 11, wherein the resin cavity has a length more than ½ of a length of the second surface or the third surface from the resin molding.

13. The secondary battery as claimed in claim 12, wherein a width of the lead electrode is between 20% and 60% of a width of the second surface or the third surface.

* * * * *

UNITED STATES PATENT AND TRADEMARK OFFICE
CERTIFICATE OF CORRECTION

PATENT NO.         : 7,521,150 B2                                    Page 1 of 1
APPLICATION NO.    : 11/848180
DATED              : April 21, 2009
INVENTOR(S)        : Kyungwon Seo et al.

It is certified that error appears in the above-identified patent and that said Letters Patent is hereby corrected as shown below:

Column 7, Claim 2, line 28    Delete "." after surface

Signed and Sealed this

Third Day of May, 2011

David J. Kappos
*Director of the United States Patent and Trademark Office*